US008990748B1

(12) United States Patent
Tidwell

(10) Patent No.: US 8,990,748 B1
(45) Date of Patent: Mar. 24, 2015

(54) TIMING IN A CIRCUIT DESIGN HAVING FINITE STATE MACHINES

(71) Applicant: Xilinx, Inc., San Jose, CA (US)

(72) Inventor: Reed P. Tidwell, Centerville, UT (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/218,574

(22) Filed: Mar. 18, 2014

(51) Int. Cl.
*G06F 17/50* (2006.01)

(52) U.S. Cl.
CPC .................................. *G06F 17/505* (2013.01)
USPC ............ 716/108; 716/103; 716/132; 716/134

(58) Field of Classification Search
USPC ................................. 716/103, 108, 132, 134
See application file for complete search history.

(56) References Cited

U.S. PATENT DOCUMENTS

| 5,258,919 | A  | * | 11/1993 | Yamanouchi et al. | ........ | 716/103 |
| 6,477,683 | B1 | * | 11/2002 | Killian et al. | ................. | 716/106 |
| 6,651,222 | B2 | * | 11/2003 | Gupta et al. | .................. | 716/102 |
| 7,428,674 | B1 | * | 9/2008 | Jacobson | ...................... | 714/724 |
| 7,890,916 | B1 | * | 2/2011 | Donlin et al. | ................. | 716/116 |
| 8,407,528 | B2 | * | 3/2013 | Larson | ............................ | 714/45 |

* cited by examiner

*Primary Examiner* — Naum B Levin
(74) *Attorney, Agent, or Firm* — LeRoy D. Maunu

(57) ABSTRACT

In one approach for improving timing in an electronic circuit design having a finite state machine (FSM), control bit logic is generated based on next state logic of the FSM that generates current state bits of the FSM. The control bit logic and a control state bit are added to operate in parallel with the next state logic and the current state bit registers, and the output signal from the control bit register replaces selected logic in logic downstream from the FSM and current state bit registers. If a worst case delay is improved with the design having the control bit logic and control state bit, the modified circuit design is saved for evaluating other possible timing improvements. Otherwise, the modification is discarded.

20 Claims, 6 Drawing Sheets

TIMING IN A CIRCUIT DESIGN HAVING FINITE STATE MACHINES

FIELD OF THE INVENTION

The disclosure generally relates to improving timing in circuit designs having finite state machines.

BACKGROUND

Finite state machines (FSMs) and their outputs are often in the critical timing paths of circuit designs. Optimization of FSMs in synthesis may result in significant reductions in timing delays. Presently, optimization of FSMs focuses on decreasing the delay in the logic that calculates the current state. Though the decrease in delay of an FSM timing to current state may improve the maximum frequency (Fmax) attainable by the FSM, the Fmax attainable by the overall system may not be improved. This is often because the delay from the FSM to downstream registers and/or output terminals is the worst case timing path. Presently, designers hand code state machines in hardware description language (HDL) and arrange the logic to decrease the delay from the FSM to downstream registers and/or output terminals. If after implementing the design specified by the HDL description, the system cannot attain the desired Fmax, achieving the desired Fmax may require changing the HDL description and recompiling, which may be painstaking and prone to errors.

SUMMARY

In one approach, a method of improving timing in an electronic circuit design includes performing operations on a programmed processor. The operations include inputting a netlist of logic equations of the electronic circuit design. The netlist specifies a finite state machine (FSM), the FSM includes next state logic and a plurality of current state bit registers, and the netlist specifies one or more downstream registers that have respective logic equations that each include a plurality of signals from the current state bit registers. For each of the downstream registers, the method includes the following operations. A first worst case delay is determined based on delays from FSM inputs to the current state bit registers, and delays from the current state bit registers to the downstream register. Respective control bit logic is generated based on one or more input signals to the next state logic that generate the signals from the current state bit registers. The respective control bit logic and a respective control bit register are added to the netlist coupled in parallel with the next state logic and current state bit registers. The plurality of signals in the respective logic equation of the downstream register is replaced with an output signal from the respective control bit register. After the adding and replacing steps, the method determines a second worst case delay of delays from the FSM inputs to the current state bit registers, and delays from the current state bit registers and control bit register to the downstream register. In response to the first worst case delay being greater than or equal to the second worst case delay, the method saves the netlist as updated by the adding and replacing steps. In response to the first worst case delay being less than the second worst case delay, the method undoes changes to the netlist as updated by the adding and replacing steps.

A system for processing an electronic circuit design is provided in another embodiment. The system includes a memory and a processor coupled to the memory. The memory is configured with instructions that are executable by the processor and when executed by the processor cause the processor to perform the following operations. The processor inputs a netlist of logic equations of the electronic circuit design. The netlist specifies a finite state machine (FSM), the FSM includes next state logic and a plurality of current state bit registers, and the netlist specifies one or more downstream registers that have respective logic equations that each include a plurality of signals from the current state bit registers. For each of the downstream registers, the processor determines a first worst case delay based on delays from FSM inputs to the current state bit registers, and delays from the current state bit registers to the downstream register. Respective control bit logic is generated based on one or more input signals to the next state logic that generate the signals from the current state bit registers. The respective control bit logic and a respective control bit register are added to the netlist coupled in parallel with the next state logic and current state bit registers. The plurality of signals in the respective logic equation of the downstream register is replaced with an output signal from the respective control bit register. After the adding and replacing, the processor determines a second worst case delay of delays from the FSM inputs to the current state bit registers, and delays from the current state bit registers and control bit register to the downstream register. In response to the first worst case delay being greater than or equal to the second worst case delay, the processor saves the netlist as updated by the adding and replacing. In response to the first worst case delay being less than the second worst case delay, the processor undoes changes to the netlist as updated by the adding and replacing.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

The disclosed methods and systems automate the process of reducing the delay from FSMs to downstream registers and/or output terminals in order to obtain a greater system Fmax without requiring manual recoding of the HDL description if the modified logic does not meet performance requirements. In an example implementation, a pre-optimization maximum delay is determined for delays from inputs to the FSM to current state bit registers of the FSM, and delays from the current state bit registers to registers and/or output terminals that are downstream from the FSM. The downstream registers and output terminals have inputs that are based on the signals from the current state bit registers. For each downstream register and output terminal, selected netlist logic that provides the input to the register or output terminal is effectively moved to be in parallel with the next state logic of the FSM. The output of that logic is used as input to a control bit register, which is added in parallel with the current state bit registers. Output from the control bit register is then connected to the downstream logic to replace the selected logic that was removed. A post-optimization maximum delay is then determined. The post-optimization maximum delay is the maximum of the delays from inputs of the FSM to the control bit register and current state bit registers, and delays from the control bit register and current state bit registers through the updated downstream logic to the downstream registers and/or output terminals. If the post-optimization maximum delay is less than the pre-optimization maximum delay, the updated logic is saved. If the post-optimization maximum delay is greater than the pre-optimization maximum delay, the updates to the logic are undone. The process is repeated for each downstream register and output terminal.

Figure 1:
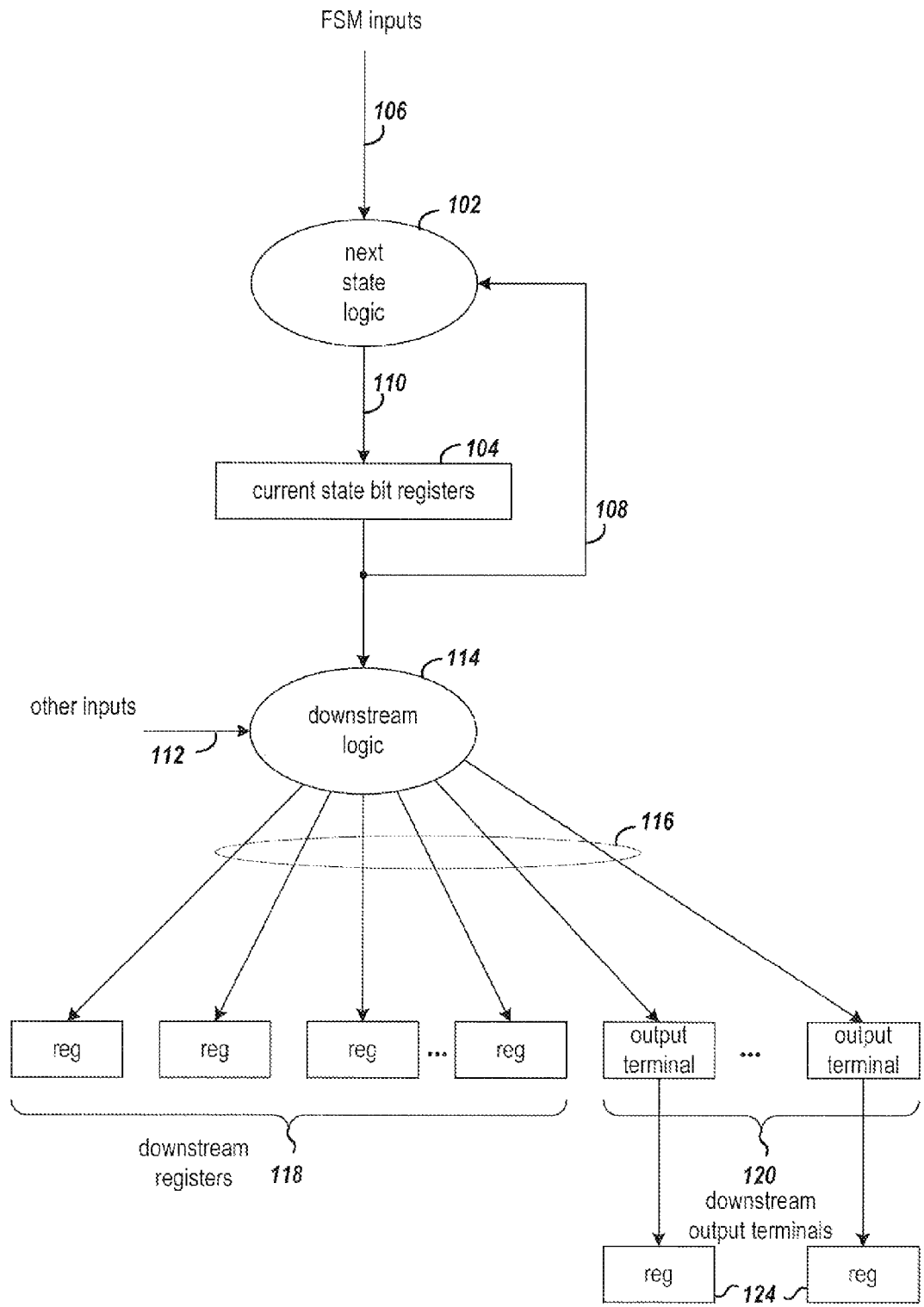
FIG. 1 shows a generalized schematic of a finite state machine (FSM) and downstream logic, downstream registers, and downstream output terminals connected to the FSM, as the FSM and downstream logic may be configured prior to optimization.

FIG. 1 shows a generalized schematic of a finite state machine (FSM) and downstream logic, downstream registers, and downstream output terminals connected to the FSM, as the FSM and downstream logic may be configured prior to optimization. The FSM logic includes next state logic 102 and current state bit registers 104. The next state logic 102 is application-specific combinational logic that determines a next state in response to the states of FSM input signals 106 and signals 108 that are fed back from the current state bit registers 104. The FSM input signals 106 and signals 108 may be referred to as FSM inputs. States of the output signals 110 from the next state logic are stored in the current state bit registers.

The output signals 108 from the current state bit registers 104, along with other input signals 112 are provided as input to the downstream logic 114. The downstream logic 114 is combinational logic that generates output signals 116 based on the states of the signals 108 and 112. The states of the output signals 116 are stored in downstream registers 118 or output on downstream output terminals 120 and then stored in registers 124. There may be additional logic (not shown) between the output terminal and the external registers, which would increase the delay from the current state bit registers. It will be appreciated that the number of signals input to and output from the downstream logic, as well as whether each signal is stored in a register or output at an output terminal, are application dependent.

FSMs and their output signals are often in critical timing paths of a circuit design. It is therefore desirable to reduce the delay associated with FSMs as much as possible. To reduce the delay, selected logic from the downstream logic 114 is moved in parallel with the next state logic, and a control bit register is added in parallel with the current state bit registers 104. The output of the control bit register is connected to the downstream logic where the selected logic was removed.

Figure 2:
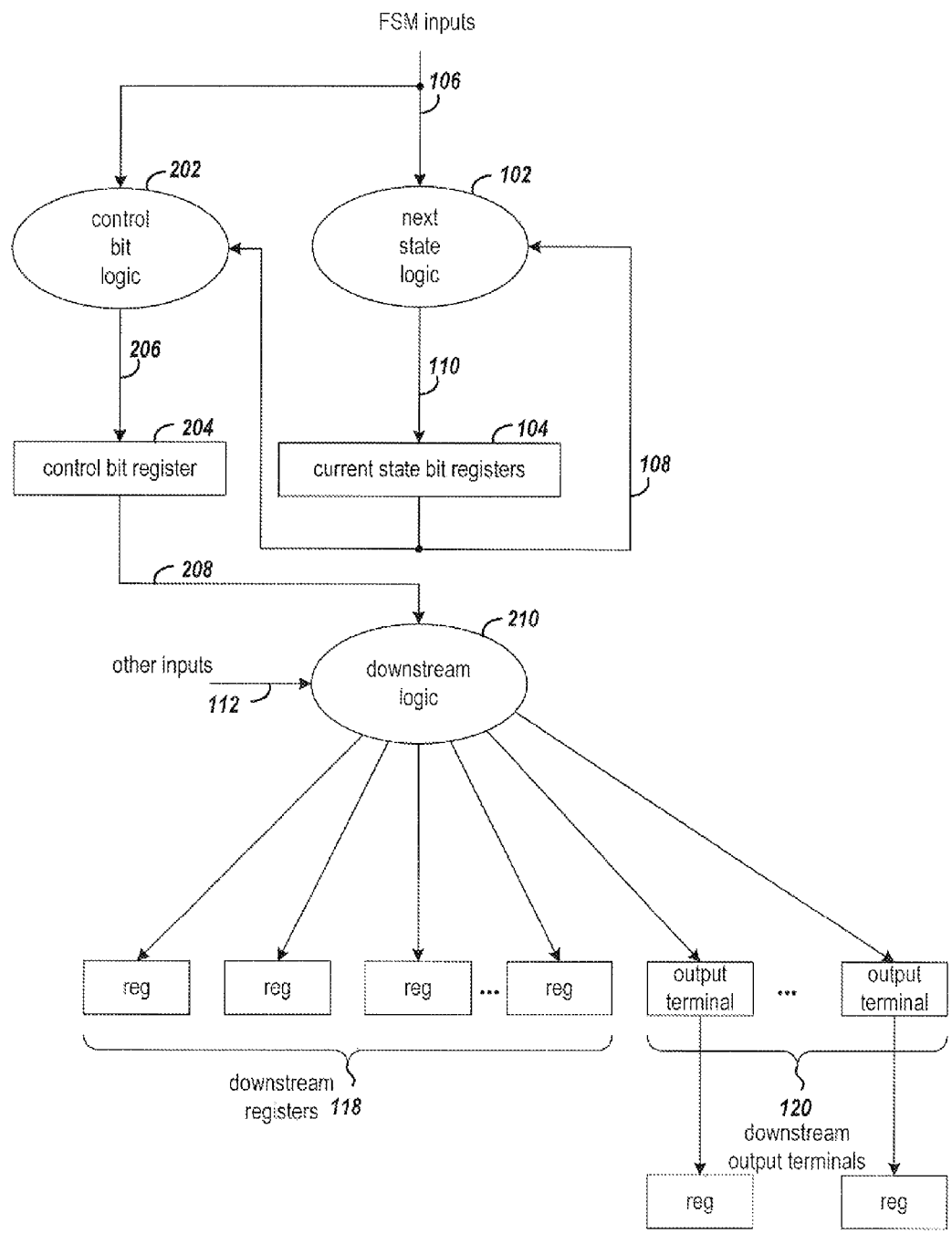
FIG. 2 shows a generalized schematic of the FSM of FIG. 1, with control bit logic and a control bit register added as optimizations.

FIG. 2 shows a generalized schematic of the FSM of FIG. 1, with control bit logic 202 and a control bit register 204 added in optimizing the circuit of FIG. 1. The complexity of the downstream logic 114 of FIG. 1 is reduced by having control values and flags, for example, enables, resets, increment/decrement, mux select, read, write, etc., determined in parallel with the next state logic and registered in parallel with the current state bit registers 104.

Some of the logic from downstream logic 114 of FIG. 1 is effectively moved to the control bit logic 202. The state of the output signal 206 from the control bit logic is stored in control bit register 204, and the output signal 208 from the control bit register is connected to the modified downstream logic 210 to replace the logic that was effectively moved. The example shown in the diagram assumes that none of the signals 108 from the current state bit registers 104 is needed by the downstream logic 210. It will be recognized, however, that in some designs, not all of the signals 108 can be optimized into control bit logic for all of the downstream registers 118 and/or downstream output terminals 120. Thus, in some designs, one or more of the signals 108 output from the current state bit registers may remain as input to the downstream logic 210. Furthermore, it will be recognized that in some cases, better overall timing may be achieved when some current state bits are replaced by a control bit in the downstream logic and others are used directly by the downstream logic.

The structure of FIG. 2 may reduce the delay of the downstream logic 114 of FIG. 1. However, in some instances, the change may result in an undesirable increase in the delay from the FSM inputs to the current state or control bit registers. In such instances, it is desirable to undo the changes made to the circuit design. Rather than manually coding the optimizations in HDL and manually undoing the changes to the HDL code if the optimizations do not decrease the overall delay as desired, the process described herein automates the making of and evaluating optimizations, as well as the saving or undoing of the optimizations.

Figure 3:
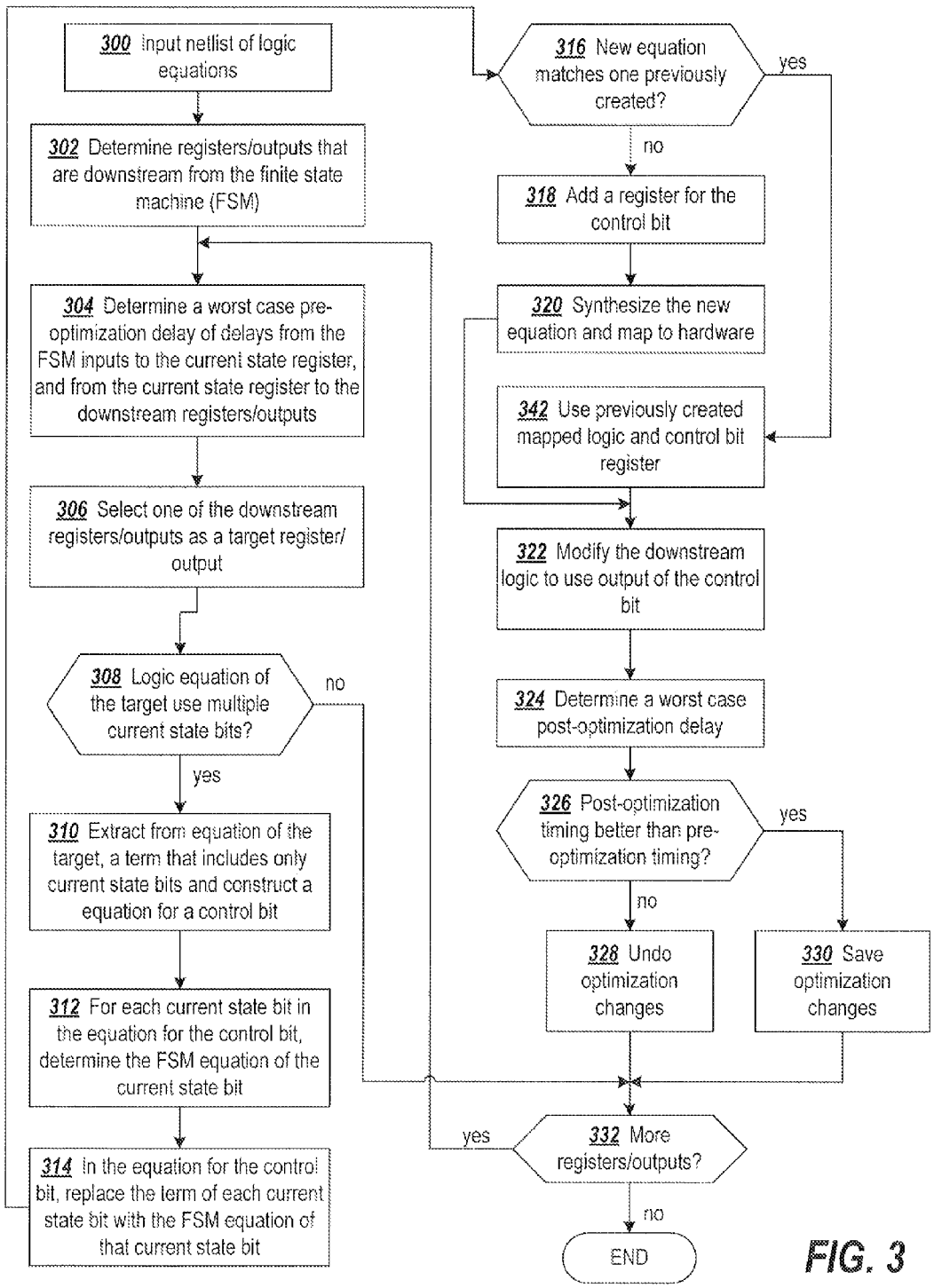
FIG. 3 is a flowchart of a process for reducing the delay from inputs to an FSM to downstream registers and/or output terminals from the FSM.

FIG. 3 is a flowchart of a process for reducing the delay from inputs to an FSM to downstream registers and/or output terminals from the FSM. At block 300, a netlist is input. The input netlist includes logic equations of the electronic circuit design and specifies a finite state machine (FSM). The FSM includes next state logic and a plurality of current state bit registers, and the netlist specifies one or more downstream registers that have respective logic equations that each include a plurality of signals from the current state bit registers.

At block 302, the process determines the registers and/or output terminals that are downstream from the FSM. In an example implementation, the output signals from the current state bit registers of the FSM are traced in the logic netlist from the current state bit registers to the next register or output terminal in the signal path. In other words, there are no intervening registers in the signal path between a current state bit register and a downstream register. Registers refer to latches, flip-flops, and similar circuit elements.

A worst case pre-optimization delay is determined at block 304. This initial or first worst-case delay is the maximum delay of the delays from the FSM inputs to the current state bit registers 104 and the delays from the current state bit registers to the downstream registers 118 and output terminals 120, which were determined at block 302. For example, delay values are determined for each of the FSM inputs to each of the current state bit registers, and delay values are determined from outputs of each of the current state bit registers to the downstream registers and output terminals. The maximum of all these delay values is the worst-case delay. In determining the delay from the current state bit registers to each of the output terminals, a specified amount of delay is added to account for the delay from the output terminal to the register 124 that captures the state of the signal at that output terminal. The delay from the output terminal to the register 124 is specified by a timing constraint that specifies the output delay and may be different for each output terminal.

Different algorithms may be applied in determining the delays. For example, one algorithm employs complex timing models of logic elements based on loads on the elements and other factors. Another algorithm, such as for field programmable gate arrays (FPGAs), may count the number of terms in the logic equations.

Figure 4:
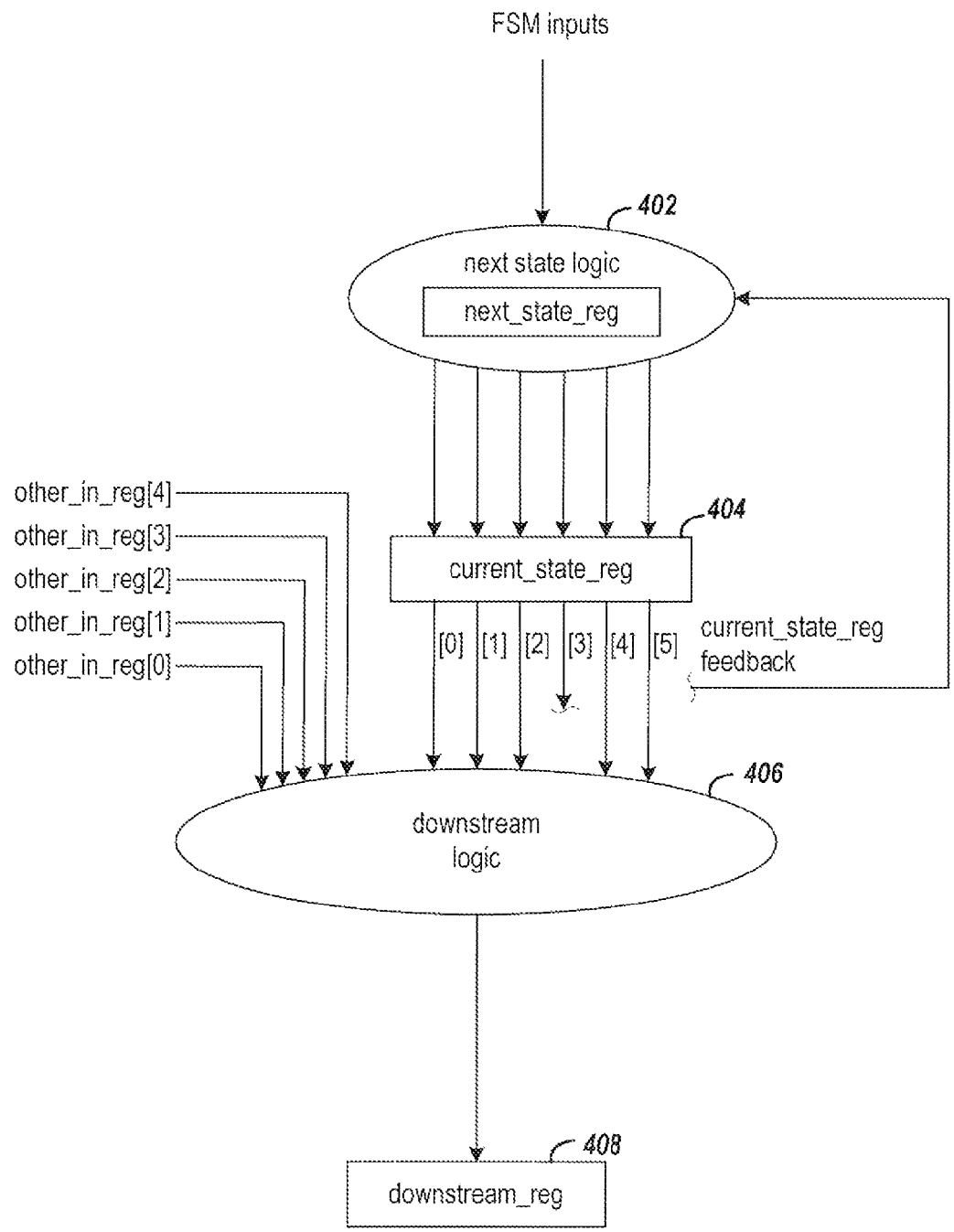
FIG. 4 shows a schematic of an FSM and a particular current state register, downstream logic, and downstream register, as the FSM and downstream logic may be configured prior to optimization.
Figure 5:
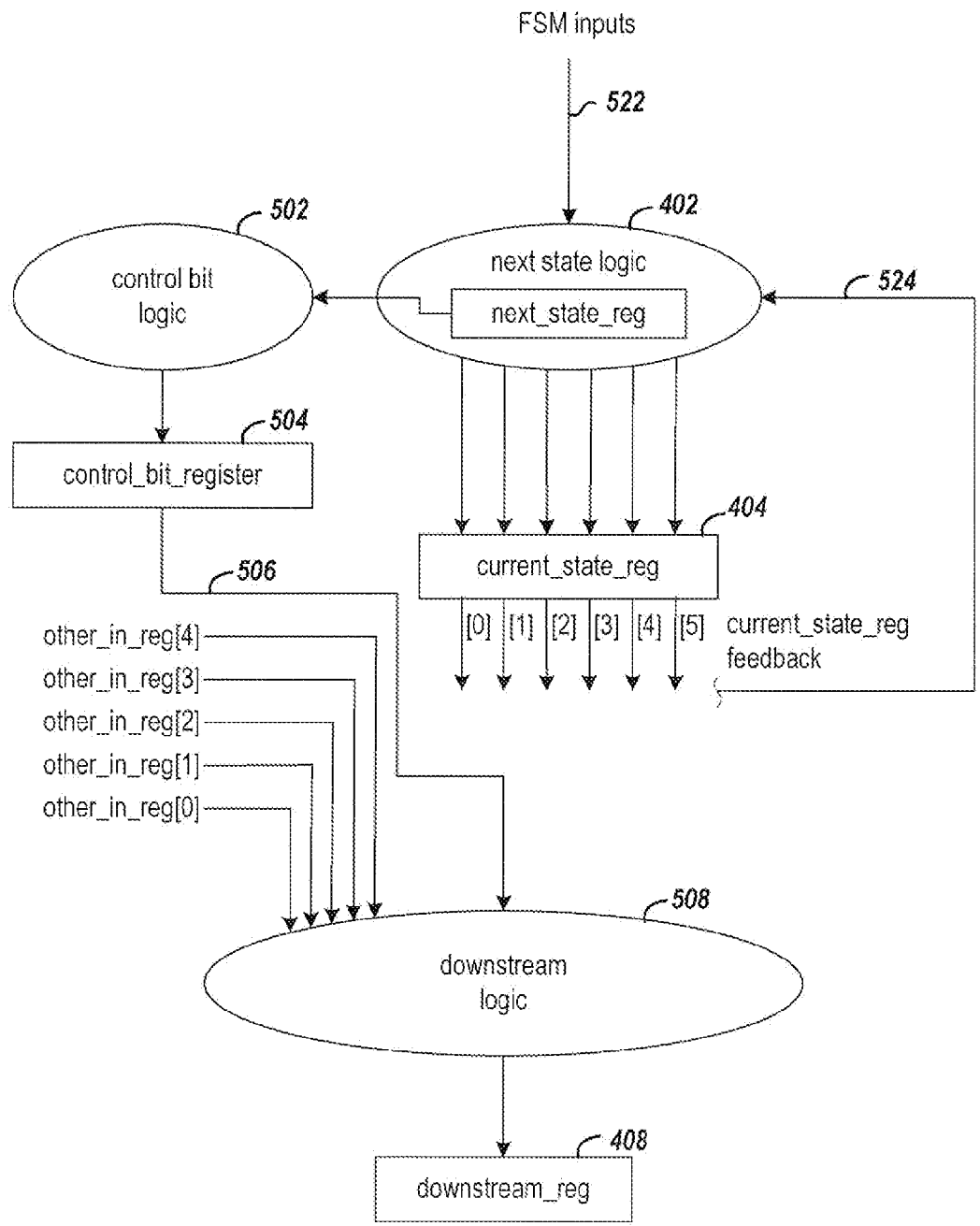
FIG. 5 shows a schematic of the FSM of FIG. 4 with control bit logic and a control bit register added as optimizations.

At block 306, one of the downstream registers/output terminals is selected as a target. The downstream logic that produces the signal whose state is captured by the target is analyzed for optimization in the following steps. FIGS. 4 and 5 present an example in which downstream logic from an FSM is analyzed for optimization and the example may be useful in illustrating the processing of FIG. 3. FIG. 4 shows the structure of the FSM and downstream logic prior to optimization, and FIG. 5 shows the structure of the FSM and downstream logic after optimization.

The FSM of FIG. 4 includes next state logic 402 and current_state_reg 404, which corresponds to the current state bit registers of FIGS. 1 and 2. The next state logic includes next_state_reg, which is used to simplify describing the logic equations for current_state_reg[0 . . . 5]. The downstream logic 406 receives input signals current_state_reg[0], [1], [2], [4], and [5] and other_in_reg[0 . . . 4]. The signal from current_state_reg [3] is not input to downstream logic 406 since it is not part of the logic that generates the signal for downstream_reg 408. One or more of the output signals from current_state_reg may be fed back for input to the next state logic. For purposes of illustrating the process of FIG. 3, downstream_reg 408 in FIG. 4 is the target downstream register.

Returning now to FIG. 3, decision block 308 determines whether or not the logic equation of the target uses multiple bits from the current state bit registers. If not, the process continues to decision block 332 to check whether or not there are any more downstream registers or output terminals to process. Otherwise, the process continues with block 310. At block 310, the logic equation that produces the input to the target is processed to extract a single term that includes only signals of the current state bit registers. This term is used to construct the equation for the control bit register. For example, the logic equation for the target downstream_reg 408 may be the following:

downstream_reg=!I1 & !I3 & !I4 & I5+I0 & !I3 & !I4 & I5+I1 & I2 & !I3 & !I4 & I5 where:

I0=current_state_reg [0]
I1=current_state_reg [2]
I2=current_state_reg [1]
I3=current_state_reg [5]
I4=current_state_reg [4]

and

I5=other_in_reg [4] & other_in_reg [3] & other_in_reg [2] & other_in_reg [1] & other_in_reg [0]

The logic equation for downstream_reg may be rearranged as:

downstream_reg=I5 & (!I1 & !I3 & !I4+I0 & !I3 & !I4+I1 & I2 & !I3 & !I4)

Thus, the single term that includes only signals from the current_state_reg extracted from the logic equation for downstream_reg is:

(!I1 & !I3 & !I4+I0 & !I3 & !I4+I1 & I2 & !I3 & !I4).

and the equation for the control bit register is:

control_bit_register'=(!I1' & !I3' & !I4'+I0' & !I3' & !I4'+I1' & I2' & !I3' & !I4').

The prime notation ("'") signifies the equation in the next state logic for the specified current state bit register. For example, I1' signifies the equation in the next state logic for the I1 current state bit register, and I1'=current_state_reg' [2].

At block 312, the process determines for each of the current state bits in the extracted term, the logic equation of the FSM next state logic that produces the current state bit. Continuing with the preceding example, current state bits 0, 1, 2, 4, and 5 are in the extracted term, which are shown as current_state_reg[0], current_state_reg [1], current_state_reg [2], current_state_reg [4], and current_state_reg [5] in FIG. 4. The logic equations of these bits may be as follows:

current_state_reg' [0]=next_state_reg [0]

current_state_reg' [2]=next_state_reg [2]

current_state_reg' [1]=next_state_reg [1]

current_state_reg' [5]=next_state_reg [5]

current_state_reg' [4]=next_state_reg [4]

For ease of illustration, this example is simplified such that the logic equations for the current state bits have only one term (i.e., next_state_reg[x]). It will be recognized that the logic equations would generally be more complex and that the process of FIG. 3 is equally applicable.

At block 314, the logic equation for the control bit logic is generated. The terms in the control bit equation determined at block 310 are replaced with the logic of the FSM next state logic that produces the current state bit corresponding to that term. For example, recall that the equation for the control bit register is:

control_bit_register=(!I1' & !I3' & !I4'+I0' & !I3' & !I4'+I1' & I2' & !I3' & !I4')

and the I1', I2', I3', and I4' terms correspond to current_state_reg' bits [0], [2], [1], [5], and [4], respectively. After replacing the terms in the equation of the control_bit_register, the resulting logic equation is:

control_bit_register=! next_state_reg [2] & ! next_state_reg [5] & ! next_state_reg [4]+next_state_reg [0]& ! next_state_reg [5] & ! next_state_reg [4]+next_state_reg [2] & next_state_reg [1] & ! next_state_reg [5] & ! next_state_reg [4]

At decision block 316, the process checks whether or not the generated logic equation and the associated control_bit_register were previously created for another downstream register or output terminal. If not, a register is added to the logic netlist for the control bit, at block 318, and the logic equation generated for the control bit is synthesized and mapped to hardware elements of a target platform. If the logic equation already exists, the processing of blocks 318 and 320 is bypassed and the previously created logic as mapped to hardware and control bit register may be used at block 342.

Referring to FIG. 5, control bit logic 502 and control_bit_register 504 are added to the circuit of FIG. 4. The control bit logic implements the logic equation of the control_bit_register, as specified above, on the target hardware. For example, the logic may be implemented on programmable logic of a programmable integrated circuit (IC) or on circuit elements of an application specific integrated circuit (ASIC).

Returning now to FIG. 3, at block 322, the downstream logic 508 is modified to use the output of the control bit. For example, referring again to FIG. 5, the downstream logic 508 is modified from the downstream logic 406 of FIG. 4 to change the logic equation for downstream_reg 408. Specifically, the modified logic for downstream_reg is:

downstream_reg=*I5* & control_bit_register

The output signals from the current_state_reg are no longer needed for the downstream logic 508 and may be disconnected. It will be recognized that the output signals may be used in the downstream logic (not shown) of other downstream registers (not shown) and/or output terminals (not shown).

After modifying the circuit specification, as in the manner shown by FIG. 5, for example, at block 324 the process determines a worst case post-optimization delay. This second worst case delay is determined as the worst delay of the delay from the newly added control bit register to the associated downstream register (e.g., from control_bit_register 504 to downstream_reg 408 in FIG. 5), and the delays from the FSM inputs to the current state bit registers (e.g., from input signals 522 and feedback signals 524 to the current_state_reg in FIG. 5).

Decision block 326 compares the post-optimization timing to the pre-optimization timing. That is, the worst case post-optimization delay is compared to the worst case pre-optimization delay. If the worst case post-optimization delay is less than or equal to the worst case pre-optimization delay, the changes made to the circuit design are saved at block 330. Otherwise the optimization changes are undone at block 328. In an example implementation, the optimized circuit design may be temporarily stored along with the version of the circuit design prior to the optimization. The optimized version may be saved by deleting the pre-optimized version, and designating the optimized version to be the current version. The changes may be undone by deleting the optimized version and designating the pre-optimized version to be the current version.

At decision block 332, the process checks whether or not there are more downstream registers or output terminals to be processed. If so, the process continues at block 304. Otherwise the process is complete.

Figure 6:
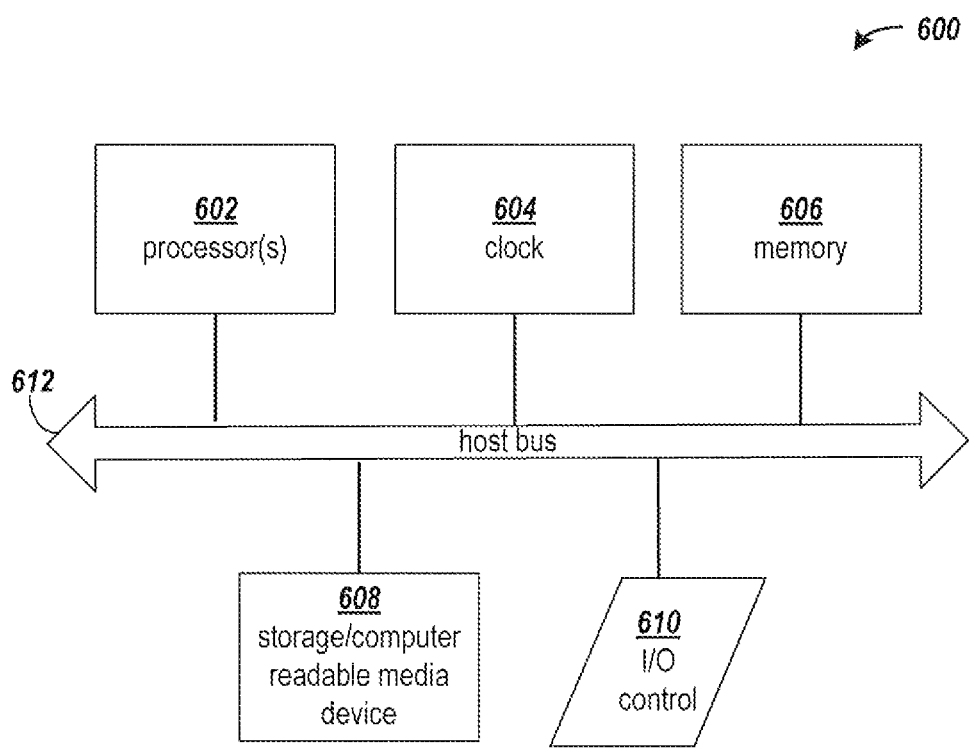
FIG. 6 shows a block diagram of an example computing arrangement that may be configured to implement the data structures and processes described herein.

FIG. 6 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, a storage arrangement 608, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory, and a main memory. The storage arrangement 608 may include local and/or remote persistent storage, such as provided by magnetic disks (not shown), flash, EPROM, or other non-volatile data storage. The storage unit may be read or read/write capable. Further, the memory arrangement 606 and storage arrangement 608 may be combined in a single arrangement.

The processor(s) 602 executes the software in storage arrangement 608 and/or memory arrangement 606, reads data from and stores data to the storage arrangement 608 and/or memory arrangement 606, and communicates with external devices through the input/output control arrangement 610. These functions are synchronized by the clock signal generator 604. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for optimizing logic associated with finite state machines. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of improving timing in an electronic circuit design, comprising:
performing on a programmed processor, operations including:
inputting a netlist of logic equations of the electronic circuit design, wherein the netlist specifies a finite state machine (FSM), the FSM includes next state logic and a plurality of current state bit registers, and the netlist specifies one or more downstream registers that have respective logic equations that each include a plurality of signals from the current state bit registers; and
for each of the downstream registers:
determining, using a computer, a first worst case delay of delays from FSM inputs to the current state bit registers, and delays from the current state bit registers to the downstream register;
generating respective control bit logic based on one or more input signals to the next state logic that generate the signals from the current state bit registers;
adding to the netlist the respective control bit logic and a respective control bit register coupled in parallel with the next state logic and current state bit registers;
replacing the plurality of signals in the respective logic equation of the downstream register with an output signal from the respective control bit register;
determining, after the adding and replacing steps, a second worst case delay of delays from the FSM inputs to the current state bit registers, and delays from the current state bit registers and control bit register to the downstream register;

saving, in response to the first worst case delay being greater than or equal to the second worst case delay, the netlist as updated by the adding and replacing steps; and undoing, in response to the first worst case delay being less than the second worst case delay, changes to the netlist as updated by the adding and replacing steps.

2. The method of claim 1, wherein the generating respective control bit logic includes separating into a single term, terms of the plurality of signals from the current state bit registers of the respective logic equation.

3. The method of claim 2, wherein the replacing includes replacing the single term with a term for the output signal from the respective control bit register.

4. The method of claim 2, wherein the generating respective control bit logic includes determining an equation of each signal of the plurality of signals from the current state bit registers.

5. The method of claim 4, wherein the single term includes respective terms for the plurality of signals from the current state bit registers, and the generating respective control bit logic includes replacing each respective term with the equation determined for each signal of the plurality of signals from the current state bit registers.

6. The method of claim 1, further comprising tracing signals in the netlist from the current state bit registers to the one or more downstream registers to determine the one or more downstream registers.

7. The method of claim 1, further comprising:

determining whether or not the respective control bit logic matches existing control bit logic currently in the netlist; and in response to the control bit logic matching existing control bit logic currently in the netlist, replacing the plurality of signals in the respective logic equation of the downstream register with an output signal from an existing control bit register that is coupled to the existing control bit logic, and bypassing the adding of the control bit logic and the control bit register to the netlist.

8. The method of claim 1, wherein the netlist specifies one or more downstream output terminals that have respective logic equations that each include a plurality of signals from the current state bit registers, the method further comprising:

for each of the downstream output terminals:

determining a third worst case delay of delays from the FSM inputs to the current state bit registers, and delays from the current state bit registers to the one or more output terminals plus a specified output delay;

generating respective control bit logic based on input signals to the next state logic that generate the one or more signals from the current state bit registers;

adding to the netlist the respective control bit logic and a respective control bit register coupled in parallel with the next state logic and current state bit registers;

replacing the plurality of signals in the logic equation of the downstream output terminal with an output signal from the respective control bit register;

determining, after the adding and replacing steps, a fourth worst case delay of delays from the FSM inputs to the current state bit registers, and delays from the current state bit registers and respective control bit register to the one or more output terminals plus a specified output delay;

saving, in response to the third worst case delay being greater than or equal to the fourth worst case delay, the netlist as updated in the adding and replacing steps;

undoing, in response to the third worst case delay being less than the fourth worst case delay, updates to the netlist from the adding and replacing steps.

9. The method of claim 8, wherein the generating respective control bit logic includes separating into a single term, terms of the plurality of signals from the current state bit registers of the respective logic equation.

10. The method of claim 9, wherein the replacing includes replacing the single term with a term for the output signal from the respective control bit register.

11. The method of claim 9, wherein the generating respective control bit logic includes determining an equation of each signal of the plurality of signals from the current state bit registers.

12. The method of claim 11, wherein the single term includes respective terms for the plurality of signals from the current state bit registers, and the generating respective control bit logic includes replacing each respective term with the equation determined for each signal of the plurality of signals from the current state bit registers.

13. A system for processing an electronic circuit design, comprising:

a memory;

a processor coupled to the memory, wherein the memory is configured with instructions that are executable by the processor and when executed by the processor cause the processor to perform operations including:

inputting a netlist of logic equations of the electronic circuit design, wherein the netlist specifies a finite state machine (FSM), the FSM includes next state logic and a plurality of current state bit registers, and the netlist specifies one or more downstream registers that have respective logic equations that each include a plurality of signals from the current state bit registers; and for each of the downstream registers:

determining a first worst case delay of delays from FSM inputs to the current state bit registers, and delays from the current state bit registers to the downstream register;

generating respective control bit logic based on one or more input signals to the next state logic that generate the plurality of signals from the current state bit registers;

adding to the netlist the respective control bit logic and a respective control bit register coupled in parallel with the next state logic and current state bit registers;

replacing the signals in the respective logic equation of the downstream register with an output signal from the respective control bit register;

determining, after the adding and replacing steps, a second worst case delay of delays from the FSM inputs to the current state bit registers, and delays from the current state bit registers and control bit register to the downstream register;

saving, in response to the first worst case delay being greater than or equal to the second worst case delay, the netlist as updated by the adding and replacing steps; and undoing, in response to the first worst case delay being less than the second worst case delay, changes to the netlist as updated by the adding and replacing steps.

14. The system of claim 13, wherein the generating respective control bit logic includes separating into a single term, terms of the plurality of signals from the current state bit registers of the respective logic equation.

15. The system of claim 14, wherein the replacing includes replacing the single term with a term for the output signal from the respective control bit register.

16. The system of claim 14, wherein the generating respective control bit logic includes determining an equation of each signal of the plurality of signals from the current state bit registers.

17. The system of claim 16, wherein the single term includes respective terms for the plurality of signals from the current state bit registers, and the generating respective control bit logic includes replacing each respective term with the equation determined for each signal of the plurality of signals from the current state bit registers.

18. The system of claim 13, wherein the memory is configured with further instructions that when executed by the processor cause the processor to trace signals in the netlist from the current state bit registers to the one or more downstream registers to determine the one or more downstream registers.

19. The system of claim 13, wherein the memory is configured with further instructions that when executed by the processor cause the processor to perform operations including:
  determining whether or not the respective control bit logic matches existing control bit logic currently in the netlist; and
  in response to the control bit logic matching existing control bit logic currently in the netlist, replacing the plurality of signals in the respective logic equation of the downstream register with an output signal from an existing control bit register that is coupled to the existing control bit logic, and bypassing the adding of the control bit logic and the control bit register to the netlist.

20. The system of claim 13, wherein the netlist specifies one or more downstream output terminals that have respective logic equations that each include a plurality of signals from the current state bit registers, and the memory is configured with further instructions that when executed by the processor cause the processor to perform operations including:
  for each of the downstream output terminals:
    determining a third worst case delay of delays from the FSM inputs to the current state bit registers, and delays from the current state bit registers to the one or more output terminals plus a specified output delay;
    generating respective control bit logic based on input signals to the next state logic that generate the one or more signals from the current state bit registers;
    adding to the netlist the respective control bit logic and a respective control bit register in parallel with the next state logic and current state bit registers;
    replacing the plurality of signals in the logic equation of the downstream output terminal with an output signal from the respective control bit register;
    determining, after the adding and replacing steps, a fourth worst case delay of delays from the FSM inputs to the current state bit registers, and delays from the current state bit registers and respective control bit register to the one or more output terminals plus a specified output delay;
    saving, in response to the third worst case delay being greater than or equal to the fourth worst case delay, the netlist as updated in the adding and replacing steps;
    undoing, in response to the third worst case delay being less than the fourth worst case delay, updates to the netlist from the adding and replacing steps.

* * * * *